Figure 1:
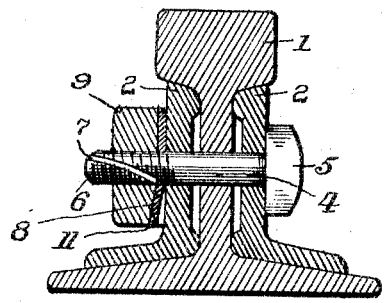

No. 777,469. PATENTED DEC. 13, 1904.
L. C. AMBERSON.
NUT LOCK.
APPLICATION FILED MAY 25, 1904.
NO MODEL.

Witnesses:

Inventor
L. C. Amberson
By  N. C. Evert & Co.
Attorneys

No. 777,469. Patented December 13, 1904.

UNITED STATES PATENT OFFICE.

LINTON C. AMBERSON, OF COVINGTON, KENTUCKY.

NUT-LOCK.

SPECIFICATION forming part of Letters Patent No. 777,469, dated December 13, 1904.

Application filed May 25, 1904. Serial No. 209,630. (No model.)

*To all whom it may concern:*

Be it known that I, LINTON C. AMBERSON, a citizen of the United States of America, residing at Covington, in the county of Kenton and State of Kentucky, have invented certain new and useful Improvements in Nut-Locks, of which the following is a specification, reference being had therein to the accompanying drawings.

This invention has relation to nut-locks, and has for its object the provision of novel means whereby a nut may be securely locked upon a bolt and prevented from rotating thereon or becoming disengaged from the bolt.

Another object of my invention is to provide a nut-lock which may be readily applied to any desired construction wherein it is essential that the nut should remain in a fixed and permanent position upon the bolt, and I have provided novel means whereby after a nut has once been placed upon the bolt it will be impossible for the same to become disengaged from the bolt upon which it is secured.

Briefly described, my improved nut-lock consists of a bolt which is provided with a spiral groove, and in connection with the bolt I employ a split washer, which is provided with a lug that is adapted to engage in the groove of the bolt, and I employ a nut which is provided with ratchet-teeth upon its one side to engage the split end of the washer, in this manner the washer and nut being locked firmly upon the bolt when the washer has been forced into engagement with the objects in which the bolt is being used.

In constructing my improved nut-lock I have built the same along as simple lines as possible, whereby the expense of manufacture is reduced to a minimum, at the same time maintaining a strong and durable construction.

The construction employed to obtain the above results will be hereinafter more fully described, and specifically pointed out in the claims, and referring to the drawings accompanying this application like numerals of reference indicate like parts throughout the several views, in which—

Figure 2:
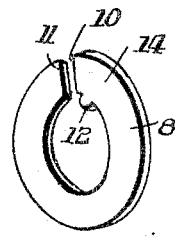
Figure 3:
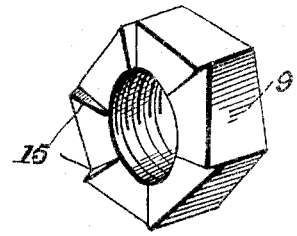
Figure 4:
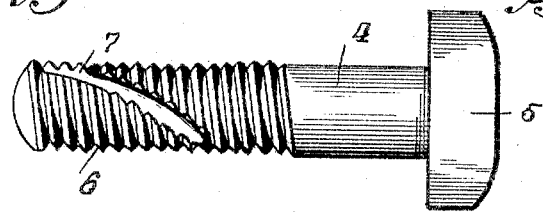
Figure 5:
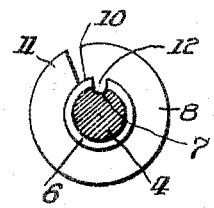

Figure 1 is a vertical sectional view of a rail and two fish-plates, showing my improved nut-lock applied thereto. Fig. 2 is a detail perspective view of a washer used in connection with my improved nut-lock. Fig. 3 is a detail perspective view of the nut, showing the ratchet-teeth formed upon one side thereof. Fig. 4 is a side elevational view of the bolt constructed in accordance with my invention; and Fig. 5 is a vertical sectional view through the bolt, showing the washer in position thereon.

In the accompanying drawings I have illustrated my improved nut-lock in Fig. 1 as applied to a rail and two fish-plates, and while I have herein shown the nut-lock as being so used it is to be understood that the same may be readily used upon constructions where it is necessary that a nut-lock be employed.

The reference-numeral 1 indicates a rail, and 2 2 fish-plates of the ordinary and well-known construction, which are secured to the rail by a bolt 4. This bolt is provided on its one end with a head 5, which may be of any desired construction, and the other end of the bolt is provided with screw-threads 6 and with a spiral groove 7. This groove extends a sufficient distance around the bolt to permit the traveling of the washer 8 upon said bolt when the nut 9 is placed thereon. The washer 8 is split, as indicated at 10, the one end of the washer being bent out of alinement with the other end of said washer to form a projection 11, and the reference-numeral 12 indicates a lug which is formed on the end 14 of the washer, said lug to engage in the spiral groove 7 of the bolt 4. The nut 9 is of the ordinary construction and is provided upon its one face with the ratchet-teeth 15, these ratchet-teeth being adapted to engage the projection 11 when the nut is secured upon the bolt.

When the bolt has been placed through the construction upon which it is to be used, the washer is placed upon the end of the bolt and then the nut 9 is placed thereon and rotated, this rotation forcing the washer along the bolt, the lug 12 traveling in the spiral groove, and I have formed this groove in this manner, whereby the friction caused by the lug projecting into the slot is partially dispensed with and the movement of the washer and nut upon the bolt greatly facilitated by forming this groove spirally. When the washer 8 has been placed in engagement with the construction through which the bolt passes, the nut is rotated until one of the ratchet-teeth 15 engages the projecting end 11 of the washer, this split end of the washer forming a spring whereby the nut may be rotated to such an extent that the projection 11 will finally impinge behind one of the shoulders of the ratchet-teeth 15 and prevent the nut from becoming loose or turning backwardly upon the bolt.

While I have herein shown the nut as being hexagonal in form, it is obvious that the same may be of a square or octagon form, and other slight changes may be made in the details of construction without departing from the scope of the invention.

What I claim is—

1. In a nut-lock, the combination with a bolt, said bolt having a spiral groove formed therein, of a split washer, a lug formed on one end of said split washer and adapted to engage in the groove of the bolt, a nut having ratchet-teeth formed therein, and adapted to engage the split end of the washer, substantially as described.

2. In a nut-lock, the combination with a bolt, said bolt having a spiral groove formed upon its end, of a split washer, one end of said washer being bent out of alinement with the other end of said washer, a lug formed on one end of said washer and adapted to engage in the spiral groove of the bolt, a nut having ratchet-teeth formed on its one side, said ratchet-teeth adapted to engage one end of the washer, substantially as described.

3. In a nut-lock, the combination with a headed bolt, having screw-threads on its one end, said bolt having a spiral groove formed therein, a split washer, one end of said washer being bent out of alinement with the other end, a lug formed on one end of said washer and adapted to engage the spiral groove of the bolt, a nut having ratchet-teeth formed thereon, said teeth adapted to engage one end of said washer.

4. In a nut-lock, the combination of a headed bolt having screw-threads on its one end, said bolt having a spiral groove formed in its screw-threaded end, a split washer, one end of said washer being bent out of alinement with the other end to form a projection, one end of said washer having a lug upon its bottom side, and adapted to engage in the spiral groove of the bolt, a nut having ratchet-teeth formed on its one side, said teeth adapted to engage the projection of the washer, substantially as described.

In testimony whereof I affix my signature in the presence of two witnesses.

LINTON C. AMBERSON.

Witnesses:
H. C. EVERT,
WM. C. HEITZ.